(12) United States Patent
Schroeder et al.

(10) Patent No.: US 6,577,123 B2
(45) Date of Patent: Jun. 10, 2003

(54) LINEAR POSITION SENSOR ASSEMBLY

(75) Inventors: Thaddeus Schroeder, Rochester Hills, MI (US); Bruno Patrice Bernard Lequesne, Troy, MI (US); Avoki M. Omekanda, Rochester, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/873,857

(22) Filed: Jun. 4, 2001

(65) Prior Publication Data

US 2002/0180427 A1 Dec. 5, 2002

(51) Int. Cl.[7] .................................................. G01B 7/14
(52) U.S. Cl. .............................. 324/207.24; 324/207.2; 324/207.21
(58) Field of Search ................... 324/207.2, 207.21, 324/207.24, 207.22

(56) References Cited

U.S. PATENT DOCUMENTS

| | | | | |
|---|---|---|---|---|
| 4,039,936 A | * | 8/1977 | Jones et al. | 324/207.21 |
| 4,875,008 A | * | 10/1989 | Lorenzen | 324/207.21 |
| 5,159,268 A | * | 10/1992 | Wu | 324/207.2 |
| 5,359,287 A | * | 10/1994 | Watanabe et al. | 324/207.21 |
| 5,450,009 A | * | 9/1995 | Murakami | 324/207.21 |
| 5,477,143 A | * | 12/1995 | Wu | 324/207.21 |
| 5,656,936 A | * | 8/1997 | Ao et al. | 324/207.21 |
| 5,814,985 A | * | 9/1998 | Oudet | 324/207.2 |
| 6,064,198 A | * | 5/2000 | Wolf et al. | 324/207.2 |
| 6,194,893 B1 | * | 2/2001 | Yokotani et al. | 324/207.21 |
| 6,218,829 B1 | * | 4/2001 | Wittenstein et al. | 324/207.21 |
| 6,246,234 B1 | * | 6/2001 | Yokotani et al. | 324/207.21 |

* cited by examiner

Primary Examiner—Edward Lefkowitz
Assistant Examiner—Darrell Kinder
(74) Attorney, Agent, or Firm—Margaret A. Dobrowitsky

(57) ABSTRACT

A linear position sensor assembly includes a moving target and a stationary magnet. A magnetic sensor is placed adjacent to the magnet and senses changes in the magnetic flux density caused by the target moving within a magnetic field generated by the stationary magnet. The magnetic sensor outputs a signal that is linear over nearly the entire length of the target.

37 Claims, 2 Drawing Sheets ing the magnetic flux density as the target moves. Also, the magnet defines a length and the slot defines a length. The signal output by the # LINEAR POSITION SENSOR ASSEMBLY

TECHNICAL FIELD

The present invention relates generally to linear position sensors.

BACKGROUND OF THE INVENTION

Modern motor vehicles are equipped with numerous sensors that enhance the safety and quality of the vehicle operation. Among these sensors are linear position sensors that are used to determine linear motion of a moving part, e.g., a throttle, a gas pedal, a brake pedal, and a clutch pedal, relative to the vehicle chassis.

Magnetic position sensors are advantageous for this type of application because they do not necessitate contact between the moving parts. Most conventional magnetic sensors are linear over a very small range. Sensor assemblies that are useful over larger ranges typically require a magnetic sensor that is as long as the range required and as such, that increases the cost of the sensor assembly. Other magnetic sensors that utilize a moving magnet have demonstrated linearity over relatively large ranges, but the moving magnet must be incorporated into the moving part, which can be quite complicated.

The present invention has recognized these prior art drawbacks, and has provided the below-disclosed solutions to one or more of the prior art deficiencies.

SUMMARY OF THE INVENTION

A linear position sensor assembly includes a mobile target and a stationary magnet that has a magnetic field that generates a magnetic flux density around the target. The magnet is spaced from the target and a magnetic sensor is placed adjacent to the magnet. The sensor senses changes in the magnetic flux density as the target moves relative to the magnet and outputs a linear signal representing changes in the magnetic flux density. Preferably, the magnetic sensor is a Hall effect sensor, a semiconductor magnetoresistor, a permalloy magnetoresistor, or a giant magnetoresistor. If a Hall sensor or a semiconductor magnetoresistor is used, it senses a component of the flux density which is normal to its surface. On the other hand, if a permalloy magnetoresistor or a giant magnetoresistor is used, it senses the component of flux density which is co-planar, or parallel, to its surface.

In one aspect of the present invention, the magnet defines a bottom and the magnetic sensor is placed adjacent to the bottom of the magnet. The target defines a direction of motion and the magnet is oriented so that the magnetic field is perpendicular the direction of motion of the target. In this aspect, the target forms a slot that changes the magnetic flux density sensed by the magnetic sensor as the target moves. Moreover, the slot defines a length and the signal output by the magnetic sensor is linear over a range between one to two millimeters (1 mm–2 mm) smaller than the length of the slot.

In another aspect of the present invention, the magnet defines a bottom and the magnetic sensor is placed adjacent to the bottom of the magnet. In this aspect of the present invention, the target defines a direction of motion and the magnet is oriented so that the magnetic field is parallel to the direction of motion. Moreover, the target defines a length and the signal output by the magnetic sensor is linear over a range between one to two millimeters (1 mm–2 mm) smaller than the length of the target.

In yet another aspect of the present invention, the magnet defines a side and the magnetic sensor is placed adjacent to the side of the magnet. In this aspect, the target defines a direction of motion and the magnet is oriented so that the magnetic field is perpendicular to the direction of motion. Furthermore, the magnet defines a length and the target defines a length. And, the signal output by the magnetic sensor is linear over a range between one to two millimeters (1 mm–2 mm) smaller than the length of the target or the length of the magnet, whichever is smaller.

In still another aspect of the present invention, the magnet defines a side and the magnetic sensor is placed adjacent to the side of the magnet. Moreover, the target defines a direction of motion and the magnet is oriented so that the magnetic field is parallel to the direction of motion. In this aspect of the present invention, the target forms a slot that changes the magnetic flux density sensed by the magnetic sensor as the target moves. Also, the magnet defines a length and the slot defines a length. The signal output by the magnetic sensor is linear over a range between one to two millimeters (1 mm–2 mm) smaller than the length of the slot or the length of the magnet, whichever is smaller.

In yet still another aspect of the present invention, a method for linearly determining the position of a moving part relative to a stationary part includes establishing a target on the moving part. Then, a magnetic sensor is disposed on or adjacent to the stationary part. A stationary magnet is disposed on or adjacent to the stationary part. In this aspect of the present invention, the magnet defines a magnetic field that permeates the magnetic sensor. Moreover, the magnetic sensor senses changes in magnetic flux density as the target moves relative to the stationary magnet.

In another aspect of the present invention, a linear position sensor assembly includes a stationary part and a moving part that moves linearly with respect to the stationary part. The sensor assembly also includes means for generating a magnetic field that emanates from the stationary part, means established by the moving part for causing changes in magnetic flux density of the magnetic field, and means for sensing changes in the magnetic flux density and outputting a linear signal representing changes in the magnetic flux density.

The present invention will now be described, by way of example, with reference to the accompanying drawings, in which:

DESCRIPTION OF AN EMBODIMENT OF THE INVENTION

Figure 1:
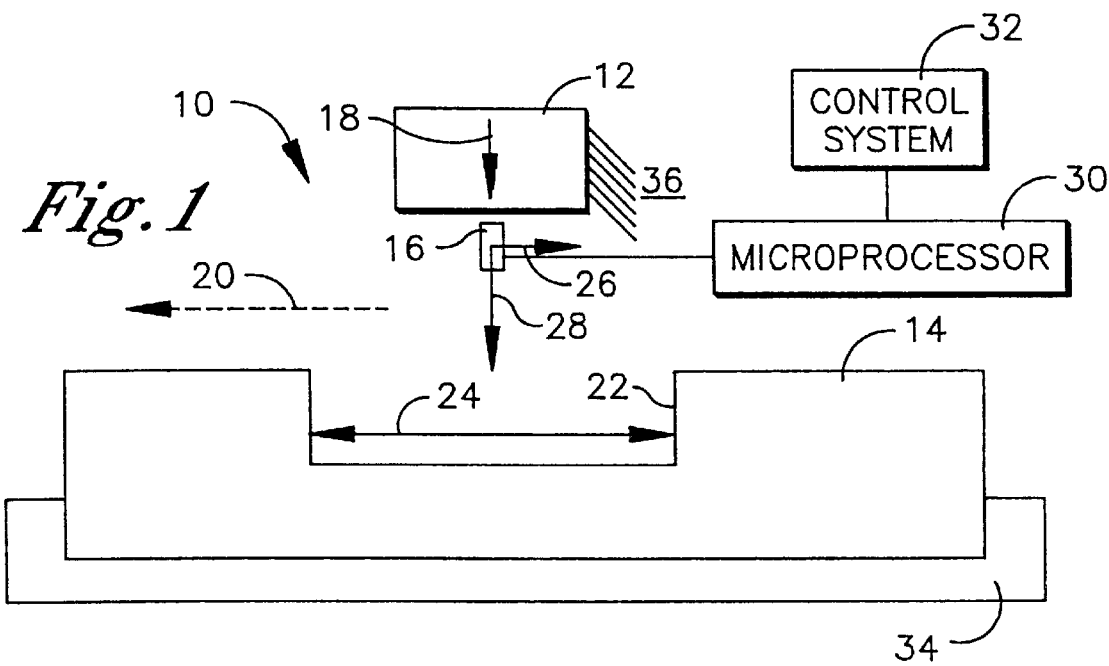
FIG. 1 is a plan view of a first embodiment of a linear position sensor assembly.

Referring initially to FIG. 1, a linear position sensor assembly is shown and generally designated 10. FIG. 1 shows that the sensor assembly 10 includes a preferably permanent magnet 12, a magnetic target 14, and a magnetic sensor 16 disposed therebetween. Preferably, the magnetic target 14 is ferrous, but it is to be appreciated that the target can be any ferromagnetic material. The magnetic sensor 16 is aligned with the center of the magnet 12, i.e., a center axis of the sensor 16 is collinear with a center axis of the magnet 12. It is to be appreciated, however, that the center axis of the sensor 16 can be offset from the center axis of the magnet 12. As shown in FIG. 1, the magnet 12 is oriented so that its magnetic field, represented by arrow 18, is perpendicular to the motion of the target 14, indicated by direction arrow 20. FIG. 1 shows that the target 14 is formed with a slot 22 having a length 24.

It is to be understood that the magnetic sensor 16 can be a Hall effect sensor, a semiconductor magnetoresistor (SMR), a permalloy magnetoresistor (PMR), or a giant magnetoresistor (GMR). For ease of discussion, the sensors can be divided into two types: type A sensors and type B sensors. Type A sensors include Hall sensors and SMRs. On the other hand type B sensors include PMRs and GMRs. It is to be appreciated that the type A sensors are sensitive to the component of flux density that is perpendicular to their surfaces. On the other hand, type B sensors are sensitive to the component of flux density that is parallel to their surfaces.

As shown in FIG. 1, the magnetic flux 18 includes a weak flux component 26 and a strong flux component 28. The weak flux component 26 is the component of the flux that causes the linear position sensor assembly 10 to output a linear signal, as described in detail below. Consequently, if a type A sensor is used, it is placed so that its surface is perpendicular to the direction of motion 20 of the target 14 and thus, perpendicular to the weak component 26 of the magnetic flux 18. On the other hand, if a type B sensor is used, it is placed so that its surface is parallel to the direction motion 20 of the target 14 and parallel to the weak component 26 of the magnetic flux 18.

FIG. 1 shows that the magnetic sensor 16 is electrically connected to a microprocessor 30. In turn, the microprocessor 30 is connected to a control system 32. As the target 14 moves, the slot 22 effects the flux density sensed by the magnetic sensor 16. The magnetic sensor 16 sends a signal representing the changes in flux density to the microprocessor 30. The microprocessor 30 processes this signal to determine the change in position of the target 14 and in turn, can send a signal representing the change in position of the target 14 to the control system 32.

As shown in FIG. 1, the target 14 can be attached to, or otherwise formed by, a moving part 34. Moreover, the magnet 12 can be affixed to a stationary part 36. Thus, the position of the moving part 34 relative to the stationary part 36 can be relatively accurately determined.

Figure 2:
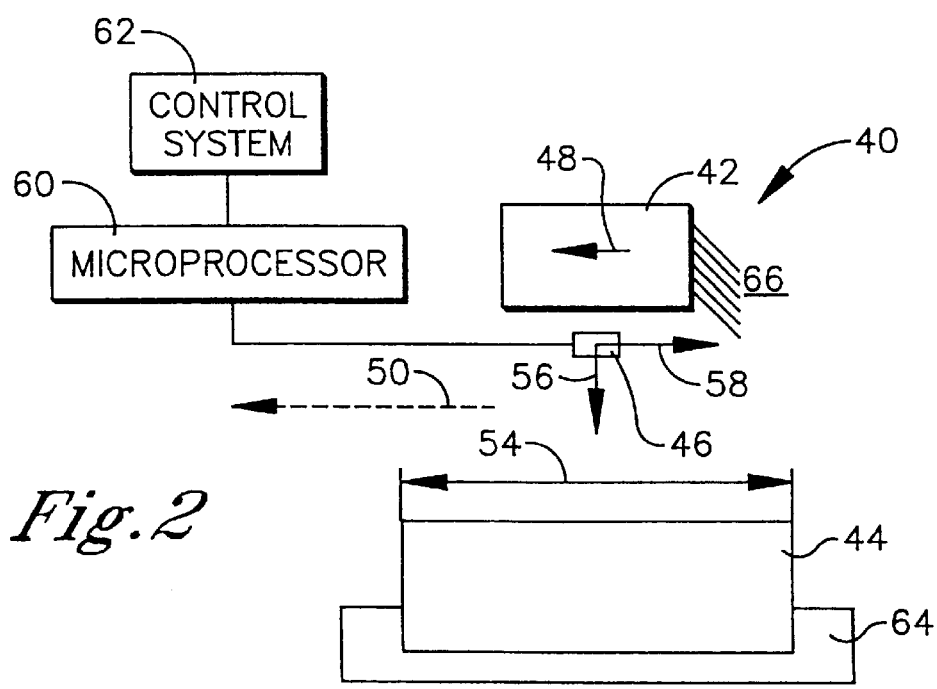
FIG. 2 is a plan view of a second embodiment of a linear position sensor assembly.

FIG. 2 shows a second embodiment of the linear position sensor assembly, generally designated 40. As shown in FIG. 2, the sensor assembly 40 includes a magnet 42, a target 44, and a magnetic sensor 46 disposed therebetween. The magnetic sensor 46 is aligned with the center of the magnet 42, i.e., a center axis of the sensor 46 is collinear with a center axis of the magnet 42. It is to be appreciated, however, that the center axis of the sensor 46 can be offset from the center axis of the magnet 42. As shown, unlike the embodiment shown in FIG. 1, the magnet 42 is oriented so that its magnetic field, represented by arrow 48, is parallel to the direction of motion of the target 14, indicated by direction arrow 50. Moreover, unlike the embodiment shown in FIG. 1, the target 44 does not form a slot.

As shown in FIG. 2, the magnetic flux 48 includes a weak flux component 56 and a strong flux component 58. The weak flux component 56 is the component of the flux that causes the linear position sensor assembly 40 to output a linear signal, as described in detail below. Consequently, if a type A sensor is used, it is placed so that its surface is parallel to the direction of motion 50 of the target 44 and thus, perpendicular to the weak component 56 of the magnetic flux 48. On the other hand, if a type B sensor is used, it is placed so that its surface is perpendicular to the direction motion 50 of the target 44 and parallel to the weak component 56 of the magnetic flux 48.

As shown in FIG. 2, the magnetic sensor 46 is electrically connected to a microprocessor 60. In turn, the microprocessor 60 is connected to a control system 62. As the target 44 moves, it effects the flux density sensed by the magnetic sensor 46. The magnetic sensor 46 sends a signal representing the changes in flux density to the microprocessor 60. The microprocessor 60 processes this signal to determine the change in position of the target 44 and in turn, can send a signal representing the change in position of the target 44 to the control system 62.

FIG. 2 shows that the target 44 can be attached to, or otherwise formed by, a moving part 64. Moreover, the magnet 42 can be affixed to a stationary part 66. Thus, the position of the moving part 64 relative to the stationary part 66 can be relatively accurately determined.

Figure 3:
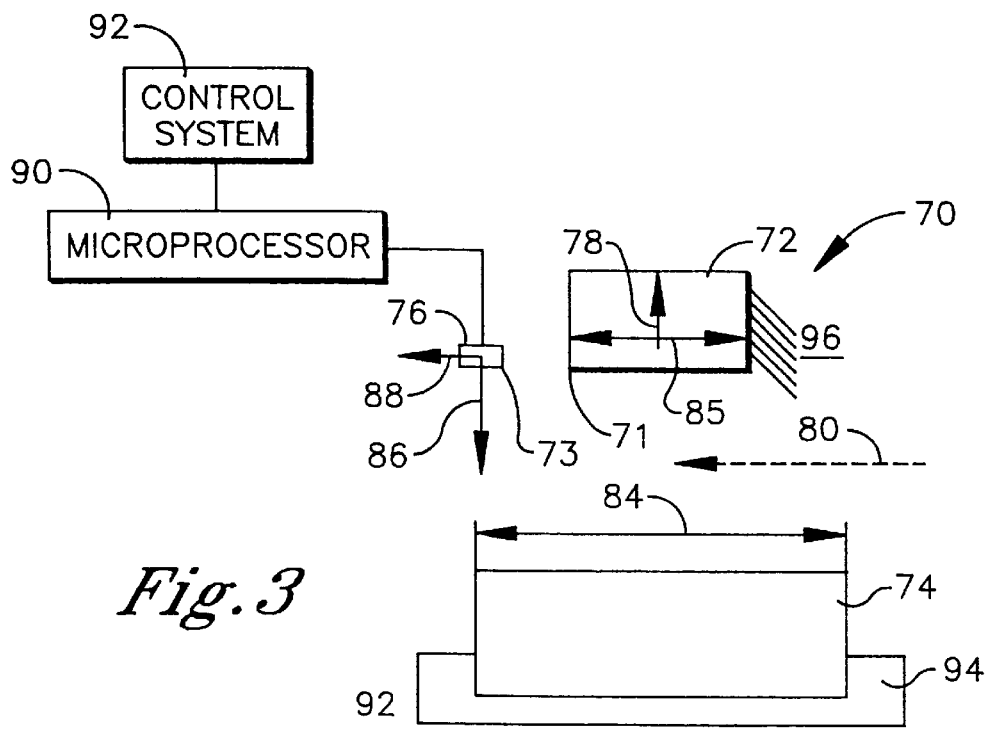
FIG. 3 is a plan view of a third embodiment of a linear position sensor assembly.

Referring to FIG. 3, a third embodiment of the linear position sensor assembly is shown and generally designated 70. FIG. 3 shows that the sensor assembly 70 includes a magnet 72, a target 74, and a magnetic sensor 76. Unlike the embodiments shown in FIGS. 1 and 2, the magnetic sensor 76 is placed adjacent to one side of the magnet 72. In this embodiment, the magnetic sensor 76 is preferably placed along the side of the magnet 72 between the midpoint of the magnet 72 and the lower edge 71 thereof. The most preferred placement is nearest to the lower edge 71 of the magnet 72, i.e., with the lower edge 73 of the sensor 76 aligned with the lower edge 71 of the magnet 72. As shown, the magnet 72 is oriented so that its magnetic field, represented by arrow 78, is perpendicular to the direction of motion of the target 74, indicated by direction arrow 80. FIG. 3 further shows that the target 74 defines a length 84 and the magnet 72 defines a length 85.

As shown in FIG. 3, the magnetic flux 78 includes a weak flux component 86 and a strong flux component 88. The weak flux component 86 is the component of the flux that causes the linear position sensor assembly 70 to output a linear signal, as described in detail below. Consequently, if a type A sensor is used, it is placed so that its surface is parallel to the direction of motion 80 of the target 74 and thus, perpendicular to the weak component 86 of the magnetic flux 78. On the other hand, if a type B sensor is used, it is placed so that its surface is perpendicular to the direction motion 80 of the target 74 and parallel to the weak component 86 of the magnetic flux 78.

FIG. 3 shows that the magnetic sensor 76 is electrically connected to a microprocessor 90. In turn, the microprocessor 90 is connected to a control system 92. As the target 74 moves, it effects the flux density sensed by the magnetic sensor 76. The magnetic sensor 76 sends a signal representing the changes in flux density to the microprocessor 90. The microprocessor 90 processes this signal to determine the change in position of the target 74 and in turn, can send a signal representing the change in position of the target 74 to the control system 92.

As shown in FIG. 3, the target 74 can be attached to, or otherwise formed by, a moving part 94. Moreover, the magnet 72 can be affixed to a stationary part 96. Thus, the position of the moving part 94 relative to the stationary part 96 can be relatively accurately determined.

Figure 4:
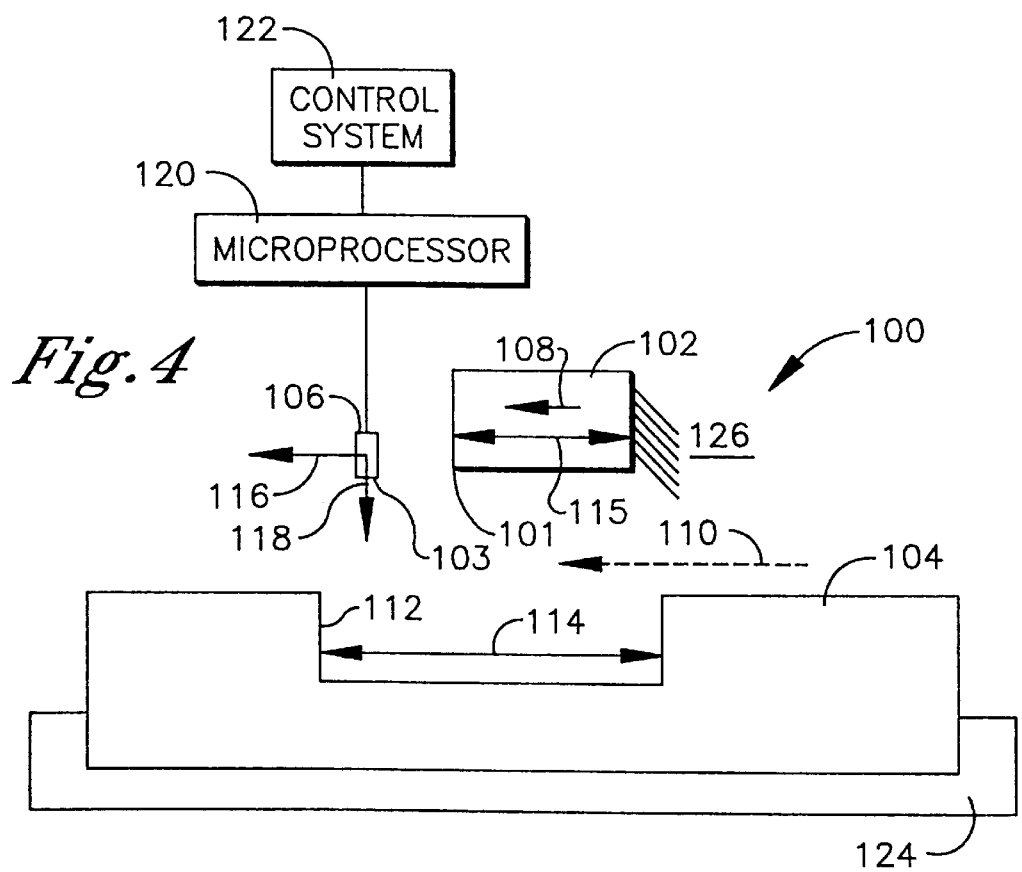
FIG. 4 is a plan view of a fourth embodiment of a linear position sensor assembly.

FIG. 4 shows a fourth embodiment of a linear position sensor assembly, generally designated 100. As shown in FIG. 4, the sensor assembly 100 includes a magnet 102, a target 104, and a magnetic sensor 106 placed adjacent to a side of the magnet 102. In this embodiment, the magnetic sensor 106 is preferably placed along the side of the magnet 102 between the midpoint of the magnet 102 and the lower edge 101 thereof. The most preferred placement is nearest to the lower edge 101 of the magnet 102, i.e., with the lower edge 103 of the sensor 106 aligned with the lower edge 101 of the magnet 102.

As further shown, the magnet 102 is oriented so that its magnetic field, represented by arrow 108, is parallel to the direction of motion of the target 104, indicated by direction arrow 110. FIG. 4 shows that the target 104 is formed with a slot 112 having a length 114. Thus, unlike the embodiments shown in FIGS. 1 through 3, the embodiment shown in FIG. 4 includes a side mounted sensor 106 and a target 104 formed with a slot 112. FIG. 4 further shows that the magnet 102 defines a length 115.

Again, as shown in FIG. 4, the magnetic flux 108 includes a weak flux component 116 and a strong flux component 118. The weak flux component 116 is the component of the flux that causes the linear position sensor assembly 100 to output a linear signal, as described in detail below. Consequently, if a type A sensor is used, it is placed so that its surface is perpendicular to the direction of motion 110 of the target 104 and thus, perpendicular to the weak component 116 of the magnetic flux 108. On the other hand, if a type B sensor is used, it is placed so that its surface is parallel to the direction motion 110 of the target 104 and parallel to the weak component 116 of the magnetic flux 108.

FIG. 4 shows that the magnetic sensor 106 is electrically connected to a microprocessor 120. In turn, the microprocessor 120 is connected to a control system 122. As the target 104 moves, the slot 112 effects the flux density sensed by the magnetic sensor 106. The magnetic sensor 106 sends a signal representing the changes in flux density to the microprocessor 120. The microprocessor 120 processes this signal to determine the change in position of the target 104 and in turn, can send a signal representing the change in position of the target 104 to the control system 122.

As shown in FIG. 4, the target 104 can be attached to, or otherwise formed by, a moving part 124. Moreover, the magnet 102 can be affixed to a stationary part 126. Thus, the position of the moving part 124 relative to the stationary part 126 can be relatively accurately determined.

In the first two embodiments of the linear position sensor assembly 10, 40 described above, the magnetic sensor 16, 46 outputs a signal that is linear over a range that is slightly smaller, i.e., one to two millimeters (1 mm–2 mm), than the length 24 of the slot 22 or the length 54 of the target 44, respectively. Conversely, in the last two embodiments of the linear position sensor assembly 70, 100 described above, the magnet sensor 76, 106 outputs a signal that is linear over a range that is slightly smaller, i.e., one to two millimeters (1 mm–2mm), than the smaller of either the magnet length 85, 115 or the target )slot) length 84, 114.

In each of the embodiments described above, the direction of magnetization 18, 48, 78, 108 of the magnet 12, 42, 72, 102 is shown either perpendicular or parallel to the direction of motion 20, 50, 80, 110 of the target 14, 44, 74, 104. However, it is to be appreciated that the direction of magnetization 18, 48, 78, 108 can be at an angle with the direction of motion 20, 50, 80, 110, e.g., plus or minus forty five degrees (±45°) from the perpendicular or parallel orientations shown.

With the configuration of structure described above, it is to be appreciated that the linear position sensor assembly 10, 40, 70, 100 can be used to determine the linear position of a moving target 14, 44, 74, 104 relative to a stationary magnetic sensor 16, 46, 76, 106 without the need for a moving magnet. As described in detail above, the linear position sensor assembly 10, 40, 70, 100 utilizes a stationary magnet 12, 42, 72, 102. Thus, the need for attaching a magnet to a moving part 34, 64, 94, 124 is obviated. As intended herein, the magnetic sensor 16, 46, 76, 106 outputs a signal that is linear over a relatively large range of motion of the target 14, 44, 74, 104.

While the particular LINEAR POSITION SENSOR ASSEMBLY as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A linear position sensor assembly, comprising:
   at least one linearly mobile target;
   at least one stationary magnet having a magnetic field that generates a magnetic flux density around the target, the magnet being spaced from the target; and
   one and only one magnetic sensor placed adjacent to the magnet, the sensor sensing changes in the magnetic flux density as the target moves linearly relative to the magnet, the sensor outputting a linear signal representing changes in the magnetic flux density.

2. The sensor assembly of claim 1, wherein the magnet defines a bottom and the magnetic sensor is placed adjacent to the bottom of the magnet, the target defining a linear direction of motion, the magnet being oriented so that the magnetic field is perpendicular the direction of motion of the target, the target forming a slot that changes the magnetic flux density sensed by the magnetic sensor as the target moves.

3. The sensor assembly of claim 2, wherein the slot defines a length and the signal output by the magnetic sensor is linear over a range between one to two millimeters (1 mm–2 mm) smaller than the length of the slot.

4. The sensor assembly of claim 3, wherein the magnetic sensor is a Hall effect sensor or a semiconductor magnetoresistor, the sensor defining a surface that is oriented perpendicular to the direction of motion of the target.

5. The sensor assembly of claim 3, wherein the magnetic sensor is a permalloy magnetoresistor or a giant magnetoresistor, the sensor defining a surface that is oriented parallel to the direction of motion of the target.

6. The sensor assembly of claim 1, wherein the magnet defines a bottom and the magnetic sensor is placed adjacent to the bottom of the magnet, the target defining a linear direction of motion, the magnet being oriented so that the magnetic field is parallel to the direction of motion of the target.

7. The sensor assembly of claim 6, wherein the target defines a length and the signal output by the magnetic sensor is linear over a range between one to two millimeters (1 mm–2 mm) smaller than the length of the target.

8. The sensor assembly of claim 7, wherein the magnetic sensor is a Hall effect sensor or a semiconductor magnetoresistor, the sensor defining a surface that is oriented parallel to the direction of motion of the target.

9. The sensor assembly of claim 7, wherein the magnetic sensor is a permalloy magnetoresistor or a giant magnetoresistor, the sensor defining a surface that is oriented perpendicular to the direction of motion of the target.

10. The sensor assembly of claim 1, wherein the magnet defines a side and the magnetic sensor is placed adjacent to the side of the magnet, the target defining a linear direction of motion, the magnet being oriented so that the magnetic field is perpendicular to the direction of motion of the target.

11. The sensor assembly of claim 10, wherein the magnet defines a length, the target defines a length, and the signal output by the magnetic sensor is linear over a range between one to two millimeters (1 mm–2 mm) smaller than the length of the target or the length of the magnet, whichever is smaller.

12. The sensor assembly of claim 11, wherein the magnetic sensor is a Hall effect sensor or a semiconductor magnetoresistor, the sensor defining a surface that is oriented parallel to the direction of motion of the target.

13. The sensor assembly of claim 11, wherein the magnetic sensor is a permalloy magnetoresistor or giant magnetoresistor, the sensor defining a surface that is oriented perpendicular to the direction of motion of the target.

14. The sensor assembly of claim 1, wherein the magnet defines a side and the magnetic sensor is placed adjacent to the side of the magnet, the target defining a linear direction of motion, the magnet being oriented so that the magnetic field is parallel to the direction of motion of the target, the target forming a slot that changes the magnetic flux density sensed by the magnetic sensor as the target moves.

15. The sensor assembly of claim 14, wherein the magnet defines a length, the slot defines a length, and the signal output by the magnetic sensor is linear over a range between one to two millimeters (1 mm–2 mm) smaller than the length of the slot or the length of the magnet, whichever is smaller.

16. The sensor assembly of claim 15, wherein the magnetic sensor is a Hall effect sensor or a semiconductor magnetoresistor, the sensor defining a surface that is oriented perpendicular to the direction of motion of the target.

17. The sensor assembly of claim 15, wherein the magnetic sensor is a permalloy magnetoresistor or a giant magnetoresistor, the sensor defining a surface that is oriented parallel to the direction of motion of the target.

18. A method for linearly determining the position of a moving part relative to a stationary part, comprising the acts of:

establishing a target on the moving part;

disposing one and only one magnetic sensor on or adjacent to the stationary part; and disposing a stationary magnet on or adjacent to the stationary part, the magnet defining a magnetic field permeating the magnetic sensor, the magnetic sensor sensing changes in magnetic flux density as the target moves linearly relative to the stationary magnet.

19. The method of claim 18, wherein the magnet defines a bottom, and the target defines a linear direction of motion, the method further comprising the act of:

disposing the magnetic sensor on or adjacent to the bottom of the magnet; and orienting the magnet so that the magnetic field is perpendicular to the direction of motion of the target.

20. The method of claim 19, further comprising the act of:

establishing a slot in the target, the slot changing the magnetic flux density sensed by the magnetic sensor as the target moves.

21. The method of claim 20, wherein the slot defines a length, and the signal output by the magnetic sensor is linear over a range between one to two millimeters (1 mm–2 mm) smaller than the length of the slot.

22. The method of claim 21, wherein the magnetic sensor is a Hall effect sensor or a semiconductor magnetoresistor, the sensor defining a surface, the method further comprising the act of:

orienting the sensor so that the surface is perpendicular to the direction of motion of the target.

23. The method of claim 21, wherein the magnetic sensor is a permalloy magnetoresistor or a giant magnetoresistor, the sensor defining a surface, the method further comprising the act of:

orienting the sensor so that the surface is parallel to the direction of motion of the target.

24. The method of claim 18, wherein the magnet defines a bottom, and the target defines a linear direction of motion, the method further comprising the act of:

disposing the magnetic sensor on or adjacent to the bottom of the magnet; and orienting the magnet so that the magnetic field is parallel to the direction of motion of the target.

25. The method of claim 24, wherein the target defines a length and the signal output by the magnetic sensor is linear over a range between one to two millimeters (1 mm–2 mm) smaller than the length of the target.

26. The method of claim 25, wherein the magnetic sensor is a Hall effect sensor or a semiconductor magnetoresistor, the sensor defining a surface, the method further comprising the act of:

orienting the sensor so that the surface is parallel to the direction of motion of the target.

27. The method of claim 25, wherein the magnetic sensor is a permalloy magnetoresistor or a giant magnetoresistor, the sensor defining a surface, the method further comprising the act of:

orienting the sensor so that the surface is perpendicular to the direction of motion of the target.

28. The method of claim 18, wherein the magnet defines a side, and the target defines a linear direction of motion, the method further comprising the act of:

disposing the magnetic sensor on or adjacent to the side of the magnet; and orienting the magnet so that the magnetic field is perpendicular to the direction of motion of the target.

29. The method of claim 28, wherein the target defines a length, the magnet defines a length and the signal output by the magnetic sensor is linear over a range between one to two millimeters (1 mm–2 mm) smaller than the length of the target or the length of the magnet, whichever is smaller.

30. The method of claim 29, wherein the magnetic sensor is a Hall effect sensor or a semiconductor magnetoresistor, the sensor defining a surface, the method further comprising the act of:

orienting the sensor so that the surface is parallel to the direction of motion of the target.

31. The method of claim 29, wherein the magnetic sensor is a permalloy magnetoresistor or a giant magnetoresistor, the sensor defining a surface, the method further comprising the act of:

orienting the sensor so that the surface is perpendicular to the direction of motion of the target.

32. The method of claim 18, wherein the magnet defines a side, and the target defines a linear direction of motion, the method further comprising the act of:

disposing the magnetic sensor on or adjacent to the side of the magnet; and orienting the magnet so that the magnetic field is parallel to the direction of motion of the target.

33. The method of claim 32, further comprising the act of:

establishing a slot in the target, the slot changing the magnetic flux density sensed by the magnetic sensor as the target moves.

34. The method of claim 32, wherein the slot defines a length, and the signal output by the magnetic sensor is linear over a range between one to two millimeters (1 mm–2 mm) smaller than the length of the slot.

35. The method of claim 32, wherein the magnetic sensor is a Hall effect sensor or a semiconductor magnetoresistor, the sensor defining a surface, the method further comprising the act of:

orienting the sensor so that the surface is perpendicular to the direction of motion of the target.

36. The method of claim 32, wherein the magnetic sensor is a permalloy magnetoresistor or a giant magnetoresistor, the sensor defining a surface, the method further comprising the act of:

orienting the magnetoresistor so that the surface is parallel to the direction of motion of the target.

37. A linear position sensor assembly, comprising:

at least one stationary part;

at least one moving part, the moving part moving linearly with respect to the stationary part;

means for generating a magnetic field emanating from the stationary part;

means established by the moving part for causing changes in magnetic flux density of the magnetic field; and one and only one means for sensing changes in the magnetic flux density and outputting a linear signal representing changes in the magnetic flux density.

* * * * *